United States Patent
Barton

(10) Patent No.: US 6,746,247 B2
(45) Date of Patent: Jun. 8, 2004

(54) CHOREOGRAPHED ATHLETIC MOVEMENT TO MUSIC

(75) Inventor: Michael Barton, Appleton, WI (US)

(73) Assignee: Michael P. Barton, Appleton, WI (US)

(*) Notice: Subject to any disclaimer, the term of this patent is extended or adjusted under 35 U.S.C. 154(b) by 46 days.

(21) Appl. No.: 10/027,217

(22) Filed: Dec. 21, 2001

(65) Prior Publication Data
US 2002/0155416 A1 Oct. 24, 2002

Related U.S. Application Data
(60) Provisional application No. 60/299,190, filed on Dec. 27, 2000.

(51) Int. Cl.$^7$ ................................................ G09B 9/00
(52) U.S. Cl. ................. 434/247; 434/252; 434/255; 434/262; 434/258; 482/51
(58) Field of Search ................. 434/247, 350, 434/252, 256–258, 262; 482/51, 4, 148

(56) References Cited

U.S. PATENT DOCUMENTS

| | | | |
|---|---|---|---|
| 3,808,707 A | | 5/1974 | Fink |
| 3,865,001 A | | 2/1975 | Hershey |
| 4,027,886 A | | 6/1977 | Katsube |
| 4,137,566 A | | 1/1979 | Haas et al. |
| 4,571,680 A | * | 2/1986 | Wu ........................... 377/24.2 |
| 4,751,642 A | | 6/1988 | Silva et al. |
| 4,776,323 A | * | 10/1988 | Spector ....................... 601/23 |
| 5,082,281 A | | 1/1992 | Berghofer |
| 5,215,468 A | | 6/1993 | Lauffer et al. |
| 5,221,088 A | | 6/1993 | McTeigue et al. |
| 5,257,084 A | | 10/1993 | Marsh |
| 5,372,365 A | | 12/1994 | McTeigue et al. |
| 5,533,947 A | | 7/1996 | Tomlinson et al. |
| 5,558,519 A | | 9/1996 | Sabowitz |
| 5,685,782 A | | 11/1997 | Lipps et al. |
| 5,728,960 A | | 3/1998 | Sitrick |
| 5,743,807 A | * | 4/1998 | Bendo et al. ............... 473/234 |
| 5,772,522 A | | 6/1998 | Nesbit et al. |
| 5,791,351 A | | 8/1998 | Curchod |
| 5,826,578 A | | 10/1998 | Curchod |
| 5,830,107 A | | 11/1998 | Brigliadoro |
| 5,857,855 A | | 1/1999 | Katayama |
| 5,871,406 A | | 2/1999 | Worrell |
| 5,893,805 A | | 4/1999 | Douglass |
| 5,904,484 A | | 5/1999 | Burns |
| 5,921,890 A | | 7/1999 | Miley |
| 5,980,429 A | | 11/1999 | Nashner |
| 6,004,243 A | | 12/1999 | Ewert |
| 6,005,548 A | | 12/1999 | Latypov et al. |
| 6,032,530 A | | 3/2000 | Hock |
| 6,036,573 A | | 3/2000 | Huang |
| 6,084,168 A | * | 7/2000 | Sitrick ....................... 84/477 R |
| 6,190,287 B1 | * | 2/2001 | Nashner ....................... 482/8 |
| 6,293,802 B1 | * | 9/2001 | Ahlgren ....................... 434/252 |
| 6,447,424 B1 | * | 9/2002 | Ashby et al. .................. 482/8 |
| 6,468,086 B1 | * | 10/2002 | Brady-Koontz ............. 434/257 |
| 6,527,674 B1 | * | 3/2003 | Clem ........................... 482/8 |

OTHER PUBLICATIONS

*Miriam–Webster Collegiate Dictionary*, Dictionary entries from "Song" and "Tempo", obtained from http://www.m–w.com, (2001), 4 pages.

* cited by examiner

Primary Examiner—S. Thomas Hughes
Assistant Examiner—John Sotomayor
(74) Attorney, Agent, or Firm—Schwegman, Lundberg, Woessner & Kluth, P.A.

(57) ABSTRACT

The present invention is directed to a method of producing an instructional tool for teaching an athlete how to develop and maintain a consistent tempo for performing a particular athletic activity. The method includes a step of analyzing the tempo of an athlete as they perform an athletic activity and then composing a song that includes a tempo which matches the tempo of an outstanding performance of the athletic activity. The appropriate tempo of the athletic activity is established by determining the amount of time between certain events in the activity when the particular athletic activity is performed at an optimum level by an athlete. The song is composed such that it includes a beat pattern with a time difference between two of the beats in the beat pattern that matches the time difference between two events in the ideally performed athletic activity.

22 Claims, 3 Drawing Sheets

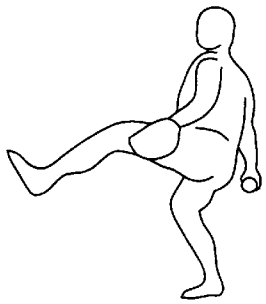
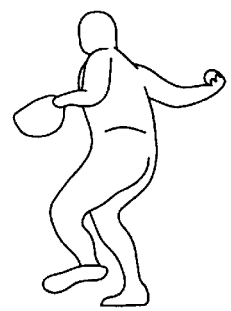
FIG. 5A    FIG. 5B    FIG. 5C
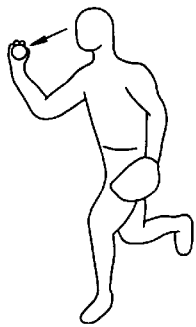
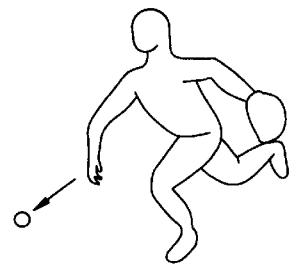
FIG. 5D    FIG. 5E
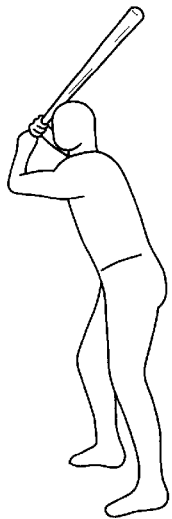
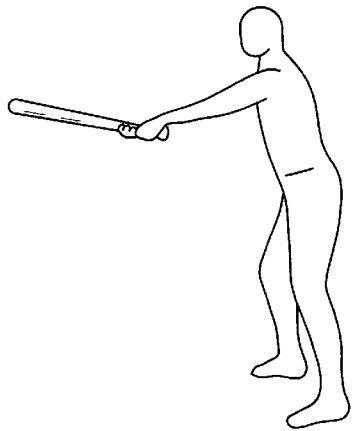
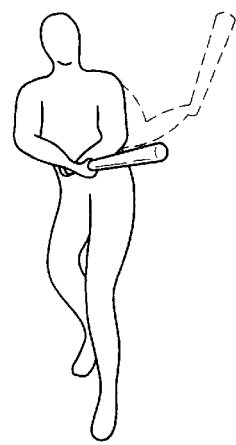
FIG. 6A    FIG. 6B    FIG. 6C

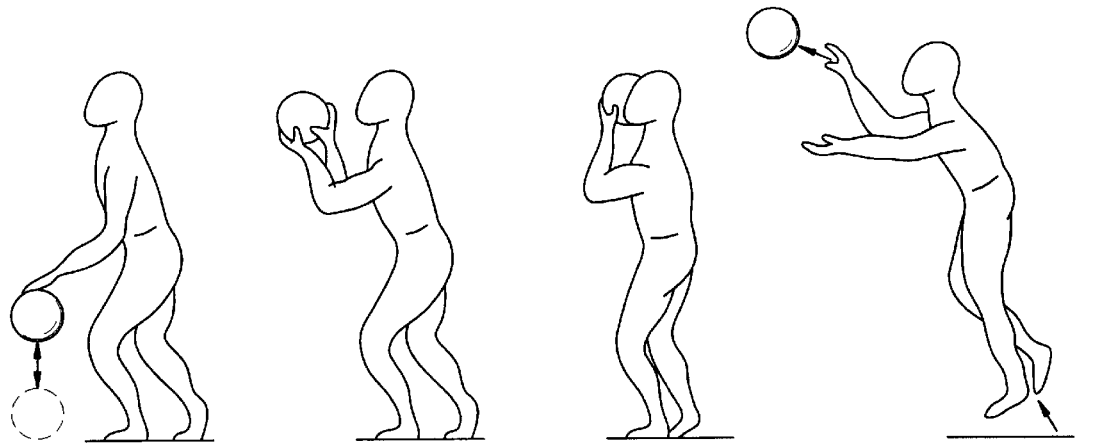
FIG. 7A    FIG. 7B    FIG. 7C    FIG. 7D
   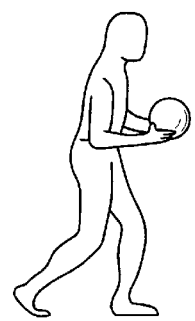   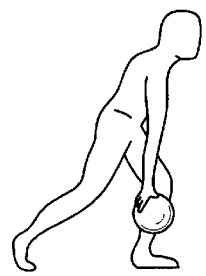
FIG. 8A    FIG. 8B    FIG. 8C
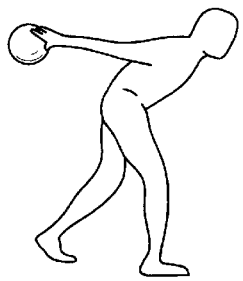   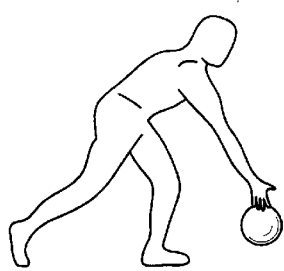   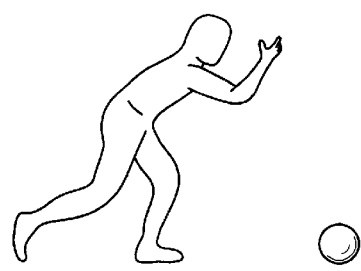
FIG. 8D    FIG. 8E    FIG. 8F

CHOREOGRAPHED ATHLETIC MOVEMENT TO MUSIC

RELATED APPLICATION

This application claims the benefit of U.S. Provisional Application Serial No. 60/299,190, filed Dec. 27, 2000.

FIELD OF THE INVENTION

The present invention is directed to the field of athletic instruction, and more particularly to a method of producing an instructional tool for teaching athletes how to develop consistent rhythm, timing and tempo.

BACKGROUND OF THE INVENTION

The importance of athletics in today's society continues to rise as evidenced by the huge amount of money that is being devoted to athletics at all levels (i.e., high school, college and professional). A good portion of the money being devoted to athletics relates to the development and use of teaching tools that are utilized to increase an athlete's skill level.

There are a variety of different tools available to train athletes. Some of these training tools are based on solid principles and facilitate improving an athlete's performance while other theories may actually harm to an athlete (i.e., by causing injury or teaching improper technique). Dedicated athletes typically rely on numerous types of training activities including specialized coaching and/or equipment.

One major theory focuses on repeating a specified number of events (i.e., drilling) to teach a particular activity. A typical example is in sprinting where a sprinter will run a particular number of sprints at designated distances. Another such example would relate to baseball where a hitter will repeatedly take swings in a batting cage.

There are additional teaching theories which relate to body movement or mechanics. These theories focus on one or more aspects of the relative location between an athlete's body parts at various points during the athletic activity. These types of theories are used with athletic activities such as baseball, tennis and high-jumping among others. The teaching tools that utilize theories based on body movement or mechanics typically relate to the mechanical aspects of the movement instead of on the tempo with which the athletic activity is performed.

There are also continuing attempts to improve athletic performance by improving the equipment associated with training for, or performing, an athletic activity. The emphasis on training equipment has resulted in technology playing a big part in the fitness equipment industry. One prominent example of improvements in equipment relates to advancements in the shoe industry. Other examples include improved tennis rackets, golf equipment and an assortment of weight training machines.

Coaches are typically able to provide general instruction to an athlete as to whether to "slow down" or "speed up" their tempo as an athlete practices the athletic activity. One drawback associated with this type of instruction is that the instruction is limited to the time a coach can actually spend with an athlete. This type of instruction is also rather imprecise because the coach is not the individual actually performing the athletic activity. The coach does not know how the athletic activity "feels" to the athlete as the athlete practices the athletic activity. In addition, these in-person coaching lessons are often quickly forgotten during the heat of competition because athletes often times unconsciously alter their rhythm and tempo as they perform the athletic activity, especially during the pressure of competition.

There are some instructional tools that are directed toward teaching an athlete to develop a consistent tempo. These tempo-related tools typically supply either a repeating audio or visual signal to an athlete to provide a sensory input which the athlete tries to match as the athlete performs the athletic activity. The rate of the signals is typically adjustable so that athletes can adjust the tempo with which they perform the athletic activity.

One such device is disclosed in U.S. Pat. No. 4,776,323 in the form of a biofeedback system which is used to train an exerciser. During operation of the biofeedback system an exerciser performs an exercise in which arms and/or feet members move rhythmically. The system translates the hand/foot movement into an audible musical rhythm.

SUMMARY OF THE INVENTION

Conventional instructional tools that attempt to teach an athlete how to develop a consistent tempo suffer from several drawbacks. One drawback is that such devices are typically not customized for a particular athlete because even though the signals emitted by the devices are adjustable, an athlete that is practicing with the aid of the device may be using a tempo that is inappropriate for that particular athlete. Another drawback associated with most of the existing devices is that the instruction they provide is limited for all practical purposes to designated practice facilities because it would be unacceptable to bring a signal-emitting instructional aid onto a field of athletic activity during completion. These limitations on existing devices are crucial because establishing tempo during practice is one thing but maintaining the appropriate tempo as the athlete feels the pressure during actual competition is quite a different situation.

The present invention solves the aforementioned problems by providing a method of producing an instructional tool for an athletic activity that teaches an athlete appropriate rhythm, timing and tempo by using the athlete's own best performances as a template. In addition, the instructional tool produced by the method of the present invention supplies the athlete with a technique that is easily translated onto the field of athletic activity.

The present invention is directed to a method of producing an instructional tool for teaching an athlete how to develop a consistent (and appropriate) tempo for performing a particular athletic activity. The method includes a step of analyzing the tempo of an athlete as they perform an athletic activity and then composing a song that includes a tempo which matches the tempo of an outstanding performance of the athletic activity. The appropriate tempo of the athletic activity is established by determining the amount of time between certain events in the activity when the particular athletic activity is performed at an optimum level by an athlete. The song is composed such that it includes a beat pattern with a time difference between two of the beats in the beat pattern that matches the time difference between two events in the ideally performed athletic activity.

The song that is composed preferably includes a musical note on a beat within the beat pattern that corresponds to one event during the athletic activity and a musical note on a beat within the beat pattern in the song that corresponds to a second event during the athletic activity. It should be noted that musical notes within the beat pattern can be replaced with the sounds of impact when a particular athletic activity includes contacting a ball (e.g., a tennis ball) or some other device.

The current invention also relates to an instructional tool for teaching an athlete how to develop a consistent rhythm, timing and tempo as the athlete performs a particular athletic activity. The instructional tool includes a storage medium (e.g., a compact disc) and a song stored on the storage medium so that the song can be readily played back at any time and location. The song stored on the storage medium includes a beat pattern that has a time difference between two beats in the beat pattern which matches a time difference between two events during an athlete's ideal performance of an athletic activity. In a preferred form, the song includes a first musical note on a beat within the beat pattern that corresponds to a first event in the athletic activity and a second musical note on a beat within the beat pattern that corresponds to a second event in the athletic activity.

Using a song to teach an appropriate rhythm, timing and tempo of a particular athletic activity is effective because most people are able to carry a song with them in their head even after the music has stopped playing. The teaching tool created by the method of the present invention allows an athlete to listen to their customized song anywhere at any time so that the athlete can embed the song within their head. Once the song is embedded in an athlete's head, the athlete can carry the tune with them anywhere. As athlete's attempt to maintain their timing during competition, especially at crucial junctures in a competition, the athlete simply needs to recall the customized swing song within their head.

The customized song could be used for any type of athletic activity where rhythm, timing and tempo are important. The timeframe for the value of such a customized song is indefinite because the athlete is continually able to refer back to the song. Athletes involved in all sports periodically suffer slumps, and listening to the song may promote shortening the lives of such slumps.

Other features and advantages of the invention will become apparent to those of ordinary skill in the art upon review of the following detailed description, claims and drawings.

BRIEF DESCRIPTION OF THE DRAWINGS

FIG. 5 illustrates various stages associated with pitching a baseball that could be incorporated into a customized song of the present invention.

FIG. 6 illustrates various stages associated with hitting a baseball that could be incorporated into a customized song of the present invention.

FIG. 7 illustrates various stages associated with shooting a basketball that could be incorporated into a customized song of the present invention.

FIG. 8 illustrates various stages associated with rolling a bowling ball that could be incorporated into a customized song of the present invention.

DETAILED DESCRIPTION

Figure 1:
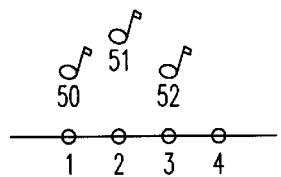
FIG. 1 illustrates one measure of a customized song in four/four time that matches the tempo of an athlete's performance as the athlete performs a particular athletic activity.
Figure 2:
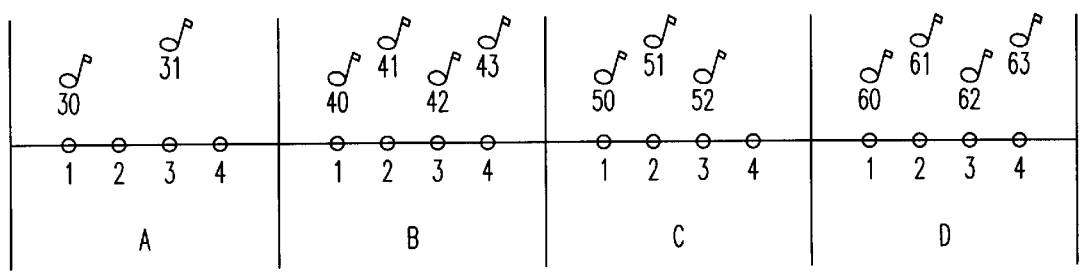
FIG. 2 illustrates a series of four measures in four/four time in a song created with the method of the present invention.

The present invention is related to a method of producing an athletic training tool for teaching an athlete how to develop consistent rhythm, timing and tempo as they perform a particular athletic activity. The method includes the steps of analyzing an athlete's performance and composing a song that matches the tempo of an athlete's ideal athletic performance. This song can be played over and over again to serve as a teaching tool for helping the athlete overcome an inconsistent tempo.

In a related aspect, the customized song is stored onto a readily playable medium (e.g., a compact disc) so that an athlete can listen to the song at any time to facilitate training the athlete to develop a consistent tempo. As the athlete performs the athletic activity while listening to the song, the athlete develops a proper and more consistent tempo.

The song is an especially effective tool because it provides an athlete with the ability to carry the tune (inside their head) onto the field of the athletic activity. As an athlete repeatedly listens to their customized song, the song becomes engrained within the athlete's head. In addition, storing the song onto a medium that can be readily played back at any time and location allows the athlete to facilitate the process of engraining the song within their head. Once the song is engrained within the athlete's head, the athlete is able to replay the tune in their head during competition.

The method of producing the athletic training tool is illustrated in FIGS. 1–4 and begins by filming the athlete with a camera, preferably a digital video camera, recording at least one of the athlete's best athletic performances. The athlete will typically be filmed at a practice facility where the athlete will conduct a number of performances identifying those performances that the athlete feels are their best performances. Only those performances that the athlete identifies as appropriate are used to compose the athlete's customized song.

Once the video and audio images are recorded, they are downloaded onto a computer. The computer includes a software program that contains editing capabilities which allow an operator to view the captured video and audio footage at many frames per second. The software is preferably Final Cut pro R1.X manufactured by Apple. The software allows the athlete's best performances to be examined frame by frame in order to establish a time frame for certain events within the athletic performances. Once the events are identified by their frame position, the events are marked within the software timeline with special audio sounds imported from the file. These events within the timeline allow a timing template to be created and played back in real time. The real time template is then looped and turned into an audio file using an audio wave-editing program, preferably Sound Forge manufactured by Sonic Foundry, or Peak 2.X manufactured by Avid. A looped audio file has its exact tempo determined by the audio wave editor. Depending on the athlete's preference, different points during the athletic activity are used to establish the timing template.

A particular athlete's timing template is now ready to be incorporated into a swing groove formula. Swing groove formulas (SGF) are beat patterns the athlete follows as the athlete performs the particular athletic activity. Each SGF is related to a time signature that has its own significant field such that the athlete should select their preferred time signature. The two time signatures that are most frequently used are 4/4 and 6/8 time. Both beat patterns include beats that correspond with events in the athletic activity. The beats within the beat pattern that correspond to specific actions within the athletic activity are not necessarily consecutive beats within the beat pattern.

The athlete's timing template and SGF are merged with the athlete's choice of song type by turning the timing template and SGF into respective audio files (e.g., WAV files). The audio files are merged with the athlete's song type which is also in the form of an audio file. The software, preferably Acid Pro 2.0 manufactured by Sonic Foundry, adjusts the tempo of the song so that it matches the athlete's ideal determined tempo as established in the timing template and SGF. Initially, the song is placed into either 4/4 or 6/8 time depending on the choice of the athlete and then increased or decreased to fit the athlete's appropriate tempo as defined in the timing template and SGF.

The song includes a musical note on a beat within a beat pattern for one event during the athletic activity and includes another musical note on a beat within the beat pattern or another event within the athletic activity. It should be noted that the number of events within the athletic activity and the corresponding number of beats within the customized song will vary depending on the athlete's preference and the type of athletic activity.

FIGS. 5–8 illustrate various stages of different athletic activities that may be incorporated into a customized song which corresponds to the respective athletic activity. The illustrated athletic activities include baseball (batting and throwing), bowling and basketball, although it should be understood that other events within these athletic activities could be incorporated without departing from the scope of the present invention. The customized song can be created for any type of athletic activity where rhythm, timing and tempo are important.

Anacrusis movements associated with a particular athletic activity may also be included or excluded from an athlete's customized song based on the athlete's preference. Anacrusis movements technically take place before an athlete begins the athletic activity. The anacrusis movements often help an athlete to establish a proper rhythm, tempo and timing during performance of the athletic movement.

Anacrusis movements come in various forms and patterns. Some examples include waggling a club head before initiating a golf swing; lightly swinging or moving a baseball bat prior to initiating a swing; and rocking back and forth prior to initiating a run in a high jump.

Another common event within many athletic activities is a takeaway. A takeaway is typically a post-anacrusis movement that is used to create stored power which will be utilized during performance of the athletic activity. Examples of a takeaway movement include the back swings in golf, tennis and hockey. Takeaway movements are inserted into an athletes customized song depending on a particular athlete's preference.

A customized song may also include a musical note on a beat within the beat pattern that corresponds to an impact event within the athletic activity. The impact event is typically related to striking some type of ball (e.g., bat contact with a baseball).

In another form of the invention, a musical note within the customized song may be replaced with a recorded sound of the impact event. The sound of the impact event may be taken from the recording of the athlete's ideal performance. It should be noted that other pre-recorded impact sounds could be used within the customized song without departing from the scope of the present invention.

FIG. 1 illustrates one measure in a form of a song that is 4/4 time. The four beats are numbered 1, 2, 3 and 4 in the illustrated measure. In this form, a musical note 50 is on beat 1 indicating a first event, a musical note 51 is on beat 2 indicating a second event, and a musical note 52 is on beat 3 indicating a third event, while beat 4 is silent. FIG. 7 illustrates a series of four measures identified as A, B, C and D where the notes in measure C are the same as those illustrated in FIG. 1. The first measure A includes a musical note 30 on beat 1 and a musical note 31 on beat 2. There are no musical notes on beats 2, 4 in measure A. Measure B includes musical notes 40–43 on each of the four beats in measure B. Finally, measure D includes musical notes on any of the four beats 1–4 that facilitates composition of the song (shown with notes 60–63 on beats 1–4 in FIG. 2).

It should be noted that the series of four measures A–D can be repeated multiple times at various intervals throughout the song without departing from the scope of the present invention. In addition, there can be four measures in series depending upon how a particular athlete would like their song composed.

Figure 3:
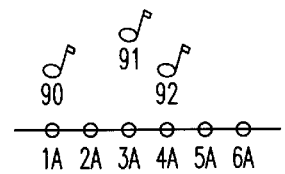
FIG. 3 illustrates one measure of a song in six/eight time that matches the tempo of an athlete's optimal performance as the athlete performs a particular athletic activity.

Referring now to FIG. 3, one measure in a song of the present invention is illustrated in 6/8 time. Each measure within a song in 6/8 time includes beats 1a–6a. When the song is in 6/8 time a first musical note 90 is on the first beat 1a in the measure and provides a signal to initiate the athletic activity, a second musical note 91 is on beat 3a in the measure and indicates to the athlete the timing for performing a second event within the athletic activity. A third musical note 92 on beat 4a then identifies to the athlete the time frame for performing yet a third event within the athletic activity.

Figure 4:
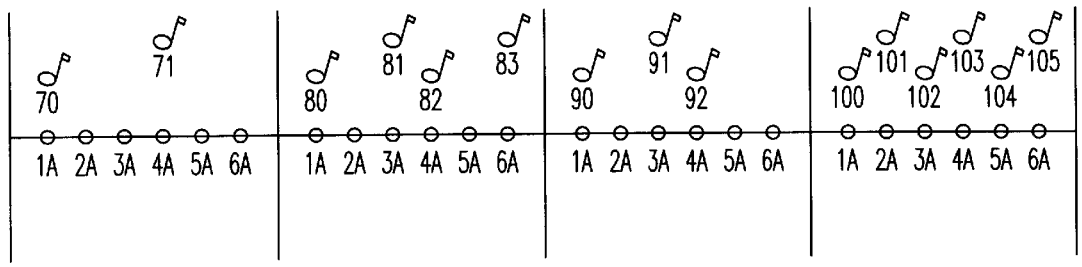
FIG. 4 illustrates a series of four measures in six/eight time in a song created with the method of the present invention.

FIG. 4 illustrates a series of four measures E–G of a song in 6/8 time. The measure E includes musical notes 70, 71 on beats 1a and 4a and measure F includes musical notes 80–83 on beats 1a, 3a, 4a and 6a. Measure C includes a beat pattern similar to the one shown in FIG. 3. Finally, measure D includes musical notes on any of the beats that facilitate composing a song that the athlete enjoys (shown with musical notes 100–105 on beats 1a–6a). Similar to a song in 4/4 time, the series of four measures in 6/8 time may be repeated multiple times throughout the song.

The customized song can be any type of music, including rock-n-roll, country & western, easy listening, Latin, big band/swing, techno, classical, rhythm & blues and hip-hop. An athlete chooses the music type and the tempo of the song is composed to fit a particular athlete's ideal tempo.

In a related form, the customized song is composed by choosing an existing song and modifying the tempo of beat pattern in the song such that a time difference between two of the beats in the modified beat pattern matches a time difference between the first event and the second event in the athletic activity. This form allows an athlete to select a favorite song and customize it so that it has the appropriate tempo.

An athlete's customized song can be downloaded onto a compact disc or cassette tape. The song can also be played in the form of a digital audio file for an MP3 player. In order to avoid logistical playback problems, the song can be looped over and over for an extended period of time onto the appropriate format. Looping the song for extended play time reduces the need to rewind the song when the athlete is using the song as a training tool.

The customized song can be merged with the previously captured video to create a new audio\video file in an appropriate format for play by a computer (e.g., AVI, MPEG, and quick Time) or some other device. The merged audio\video file allows an athlete to visually inspect the best performances while simultaneously listening to their customized song. The song and video combination provides even more feedback to the athlete as the athlete practices towards mastering a consistent rhythm, timing and tempo. It should be noted that any action that is part of an athlete's performance in a particular athletic activity can placed into their timing template. There may be certain actions within the athlete's performance that do not fit exactly within an SGF that has been customized for certain events within an athlete's ideal athletic performance of the athletic activity. If certain actions within the athletic activity do not fall within the athlete's established SGF, then the song could be modified and additional musical elements placed over the SGF so that these additional points are included in the athlete's customized song.

The foregoing description of the present invention has been presented for purposes of illustration and description. Furthermore, the description is not intended to limit the invention to the form disclosed herein. It should be noted that the same principles that are described herein could apply to other embodiments without departing from the scope of the present invention. Consequently, variations and modifications commensurate with the above teachings, and the skill and knowledge of the relevant art, are within the scope of the present invention. The embodiments described herein are further intended to explain the best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of producing an athletic training tool for teaching an individual how to develop a consistent tempo as the individual performs an athletic activity, said method comprising:

recording multiple performances of the athletic activity by said individual;

selecting a plurality of said performances that represent a desired outcome of the athletic activity for said individual;

measuring the amount of time between a first action and a second action in the selected plurality of performances;

forming music that includes a beat pattern where at least two beats in the beat pattern of music match a time difference between the first action and the second action in the selected plurality of performances performed by said individual; and using the music as a teaching tool to impart athletic timing information to the individual.

2. The method according to claim 1 wherein the first action in the athletic activity is an initial movement and the second action in the athletic activity is an end movement.

3. The method according to claim 1 wherein the athletic activity includes a third action and the beat pattern in the music includes three beats where the time difference between each of the three beats matches the time difference between the first action, the second action and the third action in the selected plurality of performances.

4. The method according to claim 1 wherein a digital audio/video file is created during said recording and software is used to analyze the digital/audio file during said measuring to measure the amount of time between the first action and the second action in the selected plurality of performances.

5. The method according to claim 1 wherein the beat pattern of the music is in 4/4 time.

6. The method according to claim 1 wherein the beat pattern of the music is in 6/8 time.

7. The method according to claim 1 wherein the music includes a musical note on a beat within the beat pattern that corresponds to the first action within the athletic activity.

8. The method according to claim 7 wherein the music includes a musical note on a beat within the beat pattern that corresponds to the second action within the athletic activity.

9. The method according to claim 7 wherein the second action in the athletic activity is an impact with an object and the music includes a recorded sound of the impact with the object on a beat within the beat pattern that corresponds to the impact with the object.

10. The method according to claim 1 wherein the at least two beats in the beat pattern that correspond to the first action and the second action are not consecutive beats within the beat pattern.

11. The method according to claim 1 wherein using a beat pattern of music further includes choosing existing music having a beat pattern and modifying the tempo of the beat pattern in the existing music to form music that includes a time difference between two beats in the beat pattern which matches a time difference between the first action and the second action in the selected plurality of performances.

12. The method according to claim 1 further comprising placing the music onto a medium that can be played back by an athlete.

13. The method according to claim 12 wherein the medium is a compact disc.

14. A method of producing an athletic training tool for teaching an individual how to develop a consistent tempo for performing a particular athletic activity, said method comprising:

recording multiple performances of the athletic activity by said individual;

selecting a plurality of said performances of the athletic activity that represent a desired outcome of the athletic activity for said individual;

measuring an amount of time between a first movement and a second movement in the selected plurality of performances of the athletic activity;

forming music that includes a beat pattern where at least two beats in the beat pattern of music match a time difference between the first movement and the second movement in the selected plurality of performances performed by said individual; and using the music as a teaching tool to impart athletic timing information to the individual.

15. The method according to claim 14 wherein recording multiple performances of the athletic activity includes recording multiple performances of the athletic activity to create a digital audio/video file, and wherein measuring the amount of time between the first movement and the second movement in the selected plurality of performances of the athletic activity includes using software to measure the amount of time between the first movement and the second movement in the selected plurality of performances.

16. The method according to claim 14 wherein the athletic activity includes impacting an object and the music includes a first musical note on a beat within the beat pattern that corresponds to the first movement of the athletic activity and a second musical note on a beat within the beat pattern that corresponds to the impact with the object during the athletic activity.

17. The method according to claim 16 wherein the impact with the object is recorded and used as the second musical note.

18. The method according to claim 16 wherein the music includes a series of four measures with the beat pattern repeated in each measure, the first musical note and the second musical note being located in one of the measures.

19. The method according to claim 18 wherein the first musical note and the second musical note are located in a third measure within the series of four measures.

20. The method according to claim 18 wherein the series of four measures within the music are repeated in a looped manner.

21. The method according to claim 18 wherein each of the four measures in the series of four measures includes unique musical notes.

22. The method according to claim 16 wherein the two beats in the beat pattern that correspond to the first movement and the impact with the object are not consecutive beats within the beat pattern.

\* \* \* \* \*